United States Patent [19]

van Deventer

[11] Patent Number: 5,455,671
[45] Date of Patent: Oct. 3, 1995

[54] OPTICAL CIRCUIT FOR A MEASURING SYSTEM FOR MEASURING THE REFLECTION SENSITIVITY OF AN OPTICAL TRANSMISSION SYSTEM

[75] Inventor: Mattijs O. van Deventer, Leidschendam, Netherlands

[73] Assignee: Koninklijke PTT Nederland N.V., Groningen, Netherlands

[21] Appl. No.: 221,034

[22] Filed: Mar. 30, 1994

[30] Foreign Application Priority Data

Apr. 8, 1993 [NL] Netherlands .......................... 9300618

[51] Int. Cl.⁶ .................................................. G01N 21/88
[52] U.S. Cl. ......................................................... 356/73.1
[58] Field of Search ............................................ 356/73.1

[56] References Cited

FOREIGN PATENT DOCUMENTS 3-181836  8/1991  Japan ................................... 356/73.1

OTHER PUBLICATIONS

Sales brochure: VB8/VB9 Series, Variable Optical Backreflectors, JDS Fitel, Inc., 570 Hester Drive, Nepean (Ottawa), Ontario, Canada K2G 5W8, Apr., 1991.
M. O. van Deventer, "Bidirectional Optical–Fibre Communication", Monograph 9101, PTT Research, Leidschendam, The Netherlands, 1991.
W. M. Emkey: "A Polarization–Independent Optical Circulator for 1.3 μm", Journal of Lightwave Technology, IEEE, vol. LT–1, No. 3, pp. 466–469, Sep., 1983.
R. Staubli; Crosstalk Penalties Due to Coherent Rayleigh Noise in Bidirectional Optical Communication Systems; Journal of Lightwave Technology; vol. 9, No. 3; Mar. 1991; N.Y., U.S.A.
Patent Abstracts of Japan; vol. 14, No. 445; Sep. 25, 1990; & JP A 02 176 535 (Fujikura Ltd).
Patent Abstracts of Japan; vol. 14, No. 376; Aug. 14, 1990; & JP A 02 140 638 (NTT).
Patent Abstracts of Japan; vol. 4, No. 145; Oct. 14, 1980; & JP A 55 097 753 (Matsushita Denki Sangyo).

*Primary Examiner*—Vincent P. McGraw
*Attorney, Agent, or Firm*—Frishauf, Holtz, Goodman, Langer & Chick

[57] ABSTRACT

Optical circuit for a measuring system for measuring the reflection sensitivity of an optical transmission network, comprising a first and a second connection point (1, 4) for a first and a second optical signal source (S1, S2), respectively, a third connection point (2) for optical receiving means (R), optical reflection means (RF), and coupling means. The coupling means consist of a first waveguide junction (C2) via which the second connection point (4) is coupled in the forward signal direction to the reflection means, and a second waveguide junction (C1) via which the first connection point (1) is coupled in the forward signal direction to the third connection point. The two junctions are coupled in such a way that the reflection means are coupled in the forward signal direction to the third connection point via the first and second junctions. Advantages: All the effects on which the reflection sensitivity of an optical transmission system depends, can be influenced, as far as possible separately and to a sufficient degree. Signal sources to be connected are not coupled in the forward signal direction.

24 Claims, 2 Drawing Sheets

OPTICAL CIRCUIT FOR A MEASURING SYSTEM FOR MEASURING THE REFLECTION SENSITIVITY OF AN OPTICAL TRANSMISSION SYSTEM

A. BACKGROUND OF THE INVENTION

1. Field of the invention

The invention is in the field of measuring systems with respect to the quality of optical transmission systems. It relates to an optical circuit for a measuring system for measuring the sensitivity of an optical transmission system involving reflections and Rayleigh backscattering, and a measuring system of the said type provided with such an optical circuit.

2. Prior art

An optical transmission line in a passive optical network, as implemented, for example, by a glass fibre, is suitable for the transmission of optical signals in two directions, which makes it unnecessary, in principle, to provide a separate line for the return path. In the case of bidirectional use there is, however, the risk of crosstalk between the optical signals in the two directions, owing to the discrete reflections and reflections by Rayleigh backscattering, as a result of which the performance of the optical transmission system in which the transmission line is incorporated, is adversely affected. Such reflections lead to receiver sensitivity degradation and represent an additional burden on the total optical power available in the optical network. This additional burden is sometimes denoted by the term crosstalk penalty. Consequently, this must be taken into account when optical networks are being designed and dimensioned, in order to prevent as far as possible, subsequent undesirable system degradation in implemented networks. For this purpose, measuring systems are known which incorporate characteristic elements of the optical network to be designed, and by means of which the reception sensitivity and the crosstalk penalty are subsequently measured. Thus reference [1] describes a measuring arrangement which is used specifically for measuring the reception sensitivity due to Rayleigh backscattering in the form of bit error probabilities and the associated crosstalk penalty in an optical communication system having two signal sources of CPFSK-modulated signals. This measuring arrangement is based on an optical circuit containing two 3 dB couplers between which a monomodal glass fibre of a certain length (typically 1 km) is incorporated, a first signal source being connected to a connection point of the first coupler, and the second signal source and the receiving means being connected to two connection points of the second coupler. The remaining connection points of the couplers are not used. The connections to the couplers are of such a type that a signal emanating from the first signal source can arrive at the receiving means (at least mainly) via the glass fibre in a forward signal direction, while a signal emanating from the second signal source can arrive at the receiving means via the glass fibre only (at least mainly) as a backscattered signal. Incorporated between each of the signal sources and the respective connection point of the coupler, to which the signal source is connected, there is a controllable optical signal attenuator for controlling the signal intensity of the generated signal. The connection points are chosen so as to be reflection-free to a high degree. This known measuring arrangement for measuring the effect of Rayleigh backscattering in a length of glass fibre has a number of drawbacks, however. A first drawback is that the signal sources are in fact coupled directly via the couplers, to one another in the forward signal direction; consequently, not only can optical feedback occur in each of the signal sources owing to backscattering effects, but also to direct signal infeed. The coupling of the signal sources to the couplers therefore requires a particularly large isolation. A second drawback is that the signal emanating from the signal source which is coupled to the receiving means in the forward signal direction, likewise must pass through the entire length of the glass fibre. In the process, the last-mentioned signal undergoes additional attenuation, and dispersion and double backscattering occur, with unclear effects on the total signal arriving at the receiving means, as a result of which a measurement is no longer reliable. A third drawback is the following. The most disadvantageous effects on the reception sensitivity occur if the backscattered signal were to be completely polarized. In the known measuring arrangement it is not, however, possible to measure the effect of a completely polarized backscattered signal without affecting the signal which emanates from the signal source which is coupled to the receiving means in the forward signal direction. Reference [2] discloses an optical circuit which is suitable for a measuring arrangement which can be used to measure the effect of a discrete reflection element. This optical circuit comprises a 3 dB coupler having four connection points and the reflection element connected to one of the four connection points, while the remaining connection points are designed for the connection of one or two signal sources and receiving means. In a first measuring arrangement, a first signal source and the reflection element in the forward signal direction are coupled to the receiving means, and signals emanating from the second signal source can only arrive at the receiving means via the reflection element. Incorporated between the reflection element and its connection to the coupler there is a controllable signal attenuator. Said first measuring arrangement based on this known optical circuit likewise has the drawback that the two signal sources are coupled to one another in the forward signal direction, so that additional isolating measures are required to prevent adverse effects on the signal generation. This measuring arrangement also has the drawback that the effect of a completely polarized reflected signal cannot be measured without affecting the signal emanating from the signal source which is coupled to the receiving means in the forward signal direction. In a second measuring arrangement, in which only one signal source is used as the transmitter, which is coupled both to the reflection element and to the receiving, or, as the case may be, detection means in the forward signal direction, it is precisely the adverse effects of reflections on the signal generation which can be measured. Measuring arrangements according to the prior art disclosed by references [1] and [2] are only of limited use as it is not stated how the effect of a finite number of discrete reflection elements, in combination or not in combination with Rayleigh backscattering, can be measured. An optical network, implemented in practice, of some size will in general contain a large number of discrete reflection points. Signals emanating from a number of such discrete reflection points may mutually interfere, however, and thus result in greater system degradation than a signal emanating from a single reflection point. Since Rayleigh backscattering may be regarded as reflection at an infinite number of discrete reflection points, the measurement thereof could be used for assessing the consequences of a finite, large number of discrete reflection points. This, however, is possible to a limited extent since, as disclosed, for example, by reference

[3], cumulative Rayleigh backscattering does not increase with length beyond a certain length which is a function of the wavelength employed of the optical signal.

In the light of the said drawbacks of the cited prior art, it can be assumed that there is a need for a novel or improved optical circuit for a measuring system of the type indicated, in which all the effects on which the reflection sensitivity of an optical transmission system depends can be influenced, as far as possible separately and to a sufficient degree, and in which signal sources to be connected are not coupled in the forward signal direction.

B. SUMMARY OF THE INVENTION

The object of the invention is to meet said need. To this end, an optical circuit for a measuring system for measuring the reflection sensitivity of an optical transmission network, which circuit comprises a first connection point for a first optical signal source, a second connection point for a second optical signal source, a third connection point for optical receiving means, optical reflection means, coupling means for coupling, via bidirectional optical connection lines, the first connection point for the first signal source to the third connection point for the receiving means, and the reflection means to the second connection point for the second signal source and the third connection point for the receiving means, which coupling means include a first waveguide junction via which the second connection point for the second signal source is coupled in the forward signal direction to the reflection means, is, according to the invention, characterized in that the coupling means further include a second waveguide junction via which the first connection point for the first signal source is coupled in the forward signal direction to the third connection point for the receiving means, which second junction is coupled to the first junction for the purpose of coupling the reflection means in the forward signal direction to the third connection point for the receiving means via the first and second junction. Owing to the manner in which the two junctions are coupled to one another, not only can the signal sources to be connected no longer interfere with one another, but it is now also possible to affect the reflected signal only, before it is coupled with signal directly emanating frown one of the signal sources.

In preferred embodiments there are incorporated, in the coupling between the first and second junction, signal-manipulating means, for example for the purpose of mortifying the signal intensity or the polarization state of the signal.

In a further preferred embodiment, the first junction is a combined power coupler/beam Splitter via which, in addition, further reflection means are coupled in the forward signal direction to the third connection point for the receiving means, in a manner similar to the first-mentioned reflection means. This has the advantage that it is possible, on the one hand, to pass more of the reflected signal to the receiving means and, on the other hand, to study, in an identical measuring arrangement the effects of two different types of reflection means.

In yet further preferred embodiments, the reflection means are formed by a bidirectional optical transmission line in which a number (N>I) of discrete reflection elements are incorporated having predetermined reflection coefficients, so that it is also possible to measure the effect of any interference which may occur in the reflected signal.

REFERENCES

[1] R.K. Stahbli and P. Gysel: "Crosstalk penalties due to coherent Rayleigh noise in bidirectional optical communication systems", J. Lightwave Technol., Vol. 9, No. 3, March 1991, pp. 375–380;

[2] Sales brochure: VBS/VB9 Series, Variable Optical Backreflectors, JDS FITEL Imc., 570 Heston Drive, Nepean (Ottawa), Ontario, Canada K2G 5W8;

[3] M.O. van Deventer: "Bidirectional optical-fibre communication", Monograph 9101, PTT Research, Leidschendam 1991, paragraph 3.1 "Reflections" and more particularly FIG. 11, p. 26;

[4] W.M. Emkey: "A polarization-independent optical circulator for 1.3 μm", J. Lightw. Techn., Vol. LT-1, No. 3, September 1983, pp. 466–469.

D. BRIEF DESCRIPTION OF THE DRAWING

The invention is explained below with reference to a drawing which comprises the following Figures.

FIG. 3a to d inclusive show four embodiments for a line of discrete reflection elements based on glass fibre.

E. DESCRIPTION OF AN ILLUSTRATIVE EMBODIMENT

Figure 1:
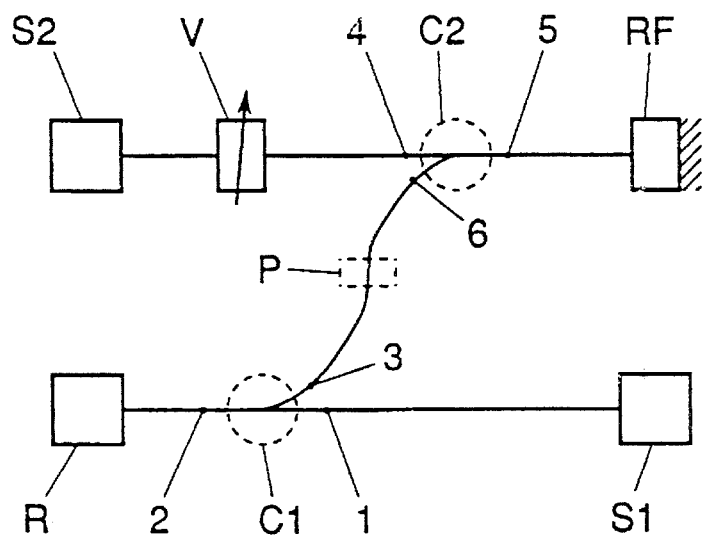
FIG. 1 shows in diagrammatic form an optical circuit according to the invention.

FIG. 1 depicts in diagrammatic form an optical circuit according to the invention. All the connecting lines between the system components depicted herein represent bidirectional optical connections, as implemented, for example, by means of a conventional type of monomodal glass fibre. A first coupler C1 has connection points 1, 2, and 3, respectively, for a first optical signal source S1, an optical signal receiver R and a second coupler C2. The second coupler has connection points 4, 5 and 6, respectively, for a second optical signal source S2, optical reflection means RF and the first coupler C1. Incorporated in the connection between the second signal source S2 in the second coupler C2 there is a controllable optical signal attenuator V. The optical reflection means reflect at least a fraction of the incoming optical signal, depending on the reflection means used. All the connections to the connection points of the couplers are, of course, designed to be as reflection free as possible. The coupler C1 is of such a type that it acts as a power coupler for signals propagating in the direction of the receiver R. The coupler C2 is of such a type that it acts as a power coupler for signals propagating in the direction of the reflection means RF and as a power splitter for signals in the opposite direction. This means that the first signal source S1, for the purpose of its signals, is coupled in the forward signal direction to the receiver R only, and that the second signal source S2, for the purpose of its signals, is coupled in the forward signal direction to the reflection means RF only. As a result of this forward signal coupling of the signal source S2, in principle all of the signal passing through the attenuator V arrives at the reflection means RF. The portion reflected thereat then propagates via the second coupler C2, half of it going in the direction of the receiver R. In the first coupler C1, this portion of the reflected signal is coupled with the signal directly emanating from the first signal source S1. The signal thus coupled is then fed directly to the receiver R. The amount of reflected signal can be controlled by means of the attenuator V which can also further attenuate the signal reflected in the direction of the signal source S2. The reflected signal in the direction of the receiving means can also be controlled by means of an attenuator V incorporated between the reflection means and the coupler C2, although in that case the reflector signal which is passed in the direction of the receiving means is likewise doubly attenuated.

In the optical connection line between the connection points 3 and 6 of the couplers C1 and C2, respectively, there is the option of manipulating still further the signal reflected in the direction of the receiving means R, before it is coupled with the signal emanating from the first signal source S1. This may, for/example, be an additional signal attenuator. Said connection line may also have polarization-affecting means incorporated therein, indicated in the Figure by P, such as a polarizer for polarizing that signal completely, or a polarization controller for controlling the direction of the polarization. Combinations are also possible, of course.

Suitable choices for the couplers C1 and C2 include conventional Y junctions. Alternatively, the second coupler C2 may be replaced by an optical circulator as disclosed, for example, by reference [4]. Such a circulator is a passive optical Waveguide junction which has at least three gates and is incorporated in,the circuit in such a way that, if the gates are numbered in accordance with the connection points 4, 5 and 6, a signal coming in via gate 4 exits in its entirety via gate 5, and a signal coming in via gate 5 exits in its entirety via gate 6. Such an optical circulator therefore has the advantage that no signal is reflected in the direction of the signal source S2, and all of the reflected signal is directed towards the receiving means R. An attenuator incorporated between gate 6 of the circulator and the connection point of the coupler 3 then has the same effect as one incorporated between the signal source S2 and gate 4 of the circulator.

Figure 2:
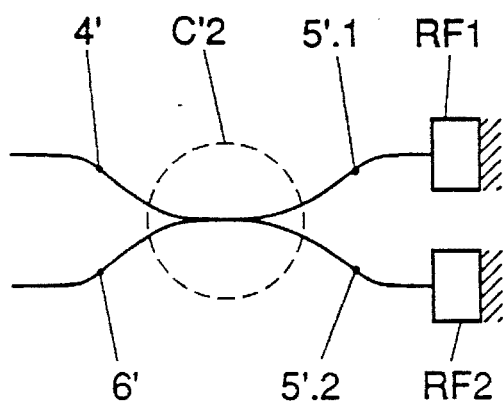
FIG. 2 shows a modified design of a component of the optical circuit shown in FIG. 1.

It is also possible to employ a 3 dB power coupler/splitter, for example the glass fibre-based fused coupler, one connection point, via. the fourth, remaining unused and being terminated in a reflection-free manner. It is, however, also possible to couple reflection means to said fourth connection point. This version is depicted in FIG. 2. The 3 dB power coupler/splitter is indicated by C'2, and its connection points by 4', 6' and 5'.1 and 5'.2, respectively, for coupling to the signal source S2, the coupler C1 and the reflection means RF1 and RF2. The reflection means RF1 and RF2 may be identical, with the advantage of a reflected signal having an intensity twice as large. The reflection means may also be chosen to be different, the one means bringing about signal reflections at one or more discrete reflection elements and the other means exhibiting exclusively, at least essentially, Rayleigh backscattering.

An optical circuit having a single discrete reflection element and/or a glass fibre of great length still provides, however, inadequate simulation options for measuring the reflection sensitivity of optical transmission systems. In practice such systems contain a large number of discrete reflection points, there being the possibility of interference of the signals of reflections at such reflection points. Measurements at a single reflector and/or a length of glass fibre on its own therefore often lead to overoptimistic estimates of the reflection sensitivity which may well rise as high as 15 dB. For the purpose of such a simulation, a number N of low-loss reflection elements $RE_1$ to $RE_N$ inclusive are connected in series, each element having a predetermined reflection coefficient $rc_i$. For the reflection coefficient, the relationship $0<rc_i<1$ holds good for $i=1,--,N-1$, while $rc_{N=}1$. The reflection coefficients are preferably chosen in such a way that there is no predominance of one or a few of the total number of reflection elements. There are various options. According to a first option, a number, for example N=30, identical reflection elements RE, for example having a reflection coefficient rc=0.01, are spaced apart at mutual distances L, for example identical spacings of 100 m. Preferably, the spacing L is chosen to be larger than the coherence length of the system to be simulated. According to a second option, the reflection coefficients $rc_i$ are chosen in such a way that all the reflected signals arrive with approximately equal strength at the input of the line of reflection elements. This can be achieved if the reflection coefficients are chosen, at least approximately, as follows:

$rc_{N=}1; rc_{N-1=}.38, rc_{N-2=}.23; rc_{N-3=}.16; rc_{N-4=}.12; rc_{N-5=} 0.10; rc_{N-6=}.08; rc_{N-7=}.07$; etc.

Figure 3A:
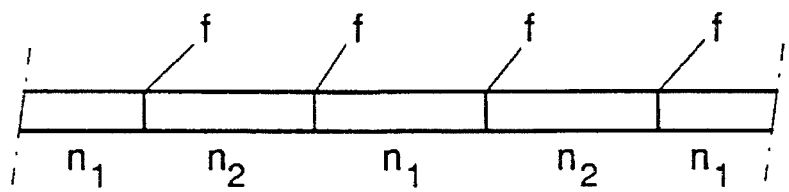
Figure 3B:
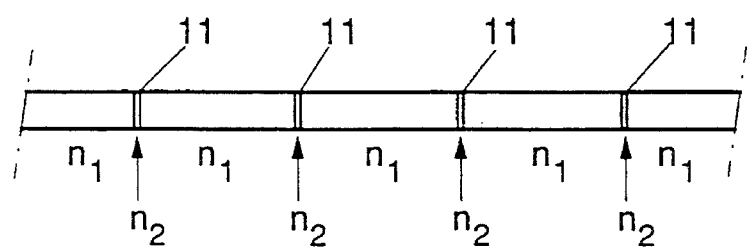
Figure 3C:
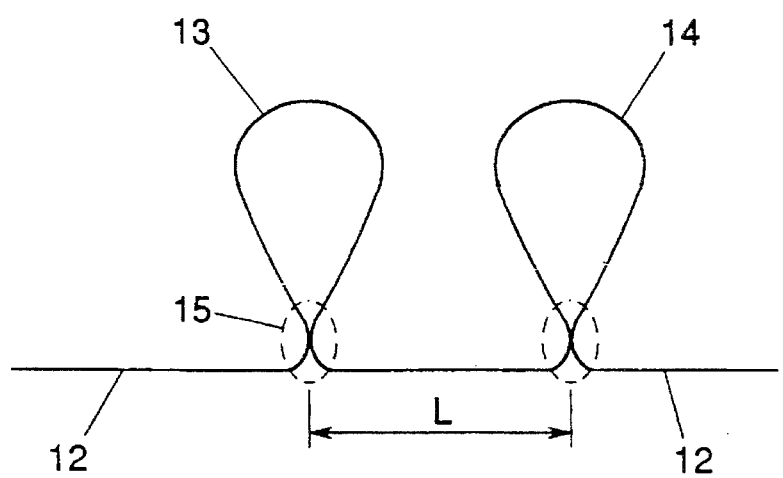
Figure 3D:
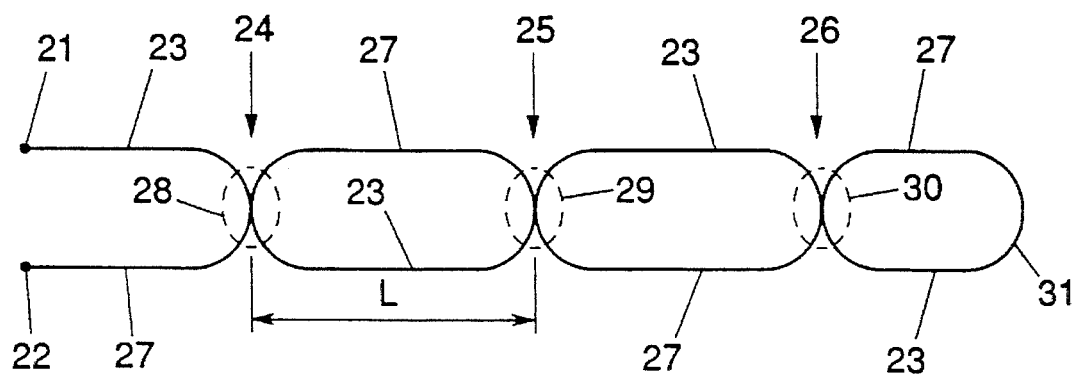

FIG. 3a to d inclusive show, in diagrammatic form, several implementations of a number of glass fibre-based reflection elements connected in series. In FIG. 3a, pieces of glass fibre of suitable length L and having different refractive indices $n_1$ and $n_2$ are in series and alternately connected by fusion welding f. The reflection coefficient of each weld is given, at least approximately, by $rc=\{(n_1-n_2)/(n_1+n_2)\}^2$. For example, for $n_{1=}1.46$ and $n_{2=}1.50$, rc=0.018, which corresponds to approximately −27 dB of reflected signal power at each weld. Something similar can be achieved by means of pieces of glass fibre having the same refractive index $n_1$ by incorporating in the fusion weld a reflection coating 11 having refractive index $n_2$. This is depicted diagrammatically in FIG. 3b. This can be implemented by causing to flow, into the gap between ends, brought close together for the purpose of coupling, of two pieces of glass fibre, molten glass of the other refractive index and then allowing it to harden. In FIG. 3c, a line of discrete reflection elements is formed in a single glass fibre 12. In said glass fibre 12 there are arranged, at a suitably chosen spacing L, closed loops of which two, viz. 13 and 14, are depicted in the Figure. The loops are closed by means of fused couplers, in this case 15 and 16, by means of which the glass fibre is caused to be coupled to itself in each loop. The loops are chosen to be so large that no losses due to "micro-bending" arise anywhere. In each loop, a portion of the signal coming in (for example from the left) is passed back (to the left), so that the loop acts as a reflection element. The portion passed back is a function of the coupling factor of the fused coupler in the loop in question. The coupling factor cf in the fused coupler in question determines the reflection coefficient rc according to rc=2cf (1-cf). A fourth embodiment for a line of discrete reflection elements, which can likewise be implemented using a single glass fibre, is depicted in FIG. 3d. A length of glass fibre having ends 21 and 22 has been twisted, as it were, for a number of times as a result of which an outward part 23 of the glass fibre crosses, at a certain number (three shown in the Figure) of points 24, 25 and 26, the return part 27 at spacings L. At the crossing points 24, 25 and 26, the glass fibre has been caused to be coupled to itself by means of fused couplers 28, 29 and 30. Here again the coupling factor cf of the fused coupler determines the reflection coefficient rc at each crossing point: rc=cf. The terminal loop 29 of the glass fibre thus twisted automatically ensures 100% reflection. Said fourth embodiment can be applied in various ways. One way for example, is to replace, in the design of the optical circuit according to FIG. 1, the coupler C2 and the reflection means RF, and to use the fibre ends 21 and 22 as connection points in a corresponding manner to the connection points 4 and 6 of the coupler C2. Another way is to replace, in the modified design of FIG. 2, the reflection means RF1 and RF2 and to connect the fibre ends 21 and 22 to the connection points 5'.1 and 5'.2 of the power coupler/splitter C'2.

It should be noted that an optical circuit according to FIG. 1 or FIG. 2 can also be used for measuring adverse effects of reflections on optical signal sources such as lasers. To this end, a signal source to be tested is connected to connection point 2, and suitable detection means are connected to connection point 1, while the connection point 4 is not used. In particular it is possible, by using a line of discrete reflection elements, to study the effects of multiple reflections.

I claim:

1. Optical circuit for a measuring system for measuring the reflection sensitivity of an optical transmission network, which circuit comprises a first connection point for a first optical signal source, a second connection point for a second optical signal source, a third connection point for optical receiving means, optical reflection means, coupling means for coupling, via bidirectional optical connection lines, the first connection point for the first signal source to the third connection point for the receiving means, and the reflection means to the second connection point for the second signal source and the third connection point for the receiving means, which coupling means include a first waveguide junction via which the second connection point for the second signal source is coupled in the forward signal direction to the reflection means, characterized in that the coupling means further includes a second waveguide junction via which the first connection point for the first signal source is coupled in the forward signal direction to the third connection point for the receiving means, which second junction is coupled to the first junction for the purpose of coupling the reflection means in the forward signal direction to the third connection point for the receiving means via the first and second junction.

2. The optical circuit according to claim 1, characterized in that there are incorporated, in the coupling between the first and second junction, signal-manipulating means.

3. The optical circuit according to claim 1, characterized in that the second junction comprises an optical circulator having three gates.

4. The optical circuit according to claim 2, characterized in that the second junction comprises an optical circulator having three gates.

5. The optical circuit according claim 1, characterized in that the second junction comprises a combined power coupler/beam splitter via which, in addition, further reflection means are coupled in the forward signal direction to the third connection point for the receiving means.

6. The optical circuit according claim 2, characterized in that the second junction comprises a combined power coupler/beam splitter via which, in addition, further reflection means are coupled in the forward signal direction to the third connection point for the receiving means.

7. The optical circuit according to claim 1, characterized in that the reflection means comprises a bidirectional optical transmission line in which a number (N>I) of discrete reflection elements are incorporated having predetermined reflection coefficients.

8. The optical circuit according to claim 2, characterized in that the reflection means comprises a bidirectional optical transmission line in which a number (N>I) of discrete reflection elements are incorporated having predetermined reflection coefficients.

9. The optical circuit according to claim 3, characterized in that the reflection means comprises a bidirectional optical transmission line in which a number (N>I) of discrete reflection elements are incorporated having predetermined reflection coefficients.

10. The optical circuit according to claim 4, characterized in that the reflection means comprises a bidirectional optical transmission line in which a number (N>I) of discrete reflection elements are incorporated having predetermined: reflection coefficients.

11. The optical circuit according to claim 5, characterized in that the first-mentioned reflection means comprises a bidirectional optical transmission line in which a number (N>I) of discrete reflection elements are incorporated having predetermined reflection coefficients, and in that the further reflection means comprises a glass fibre which terminates in a reflection-free manner and has a predetermined length.

12. The optical circuit according to claim 6, characterized in that the first-mentioned reflection means comprises a bidirectional optical transmission line in which a number (N>I) of discrete reflection elements are incorporated having predetermined reflection coefficients, and in that the further reflection means comprises a glass fibre which terminates in a reflection-free manner and has a predetermined length.

13. The optical circuit according to claim 7, characterized in that the transmission line comprises a number of concatenated pieces of glass fibre of suitable length, alternately having different refractive indices, coupled together by means of fusion welding.

14. The optical circuit according to claim 7, characterized in that the transmission line comprises a number of concatenated pieces of glass fibre of suitable length, having identical refractive indices, coupled together by means of fusion welding, there being incorporated in each fusion weld a reflection coating.

15. The optical circuit according to claim 7, characterized in that the transmission line comprises a glass fibre wherein, at suitably chosen spacings, loops are formed, each loop being closed by means of a fused coupler of the glass fibre with itself, using a suitably chosen coupling factor.

16. The optical circuit according to claim 7, characterized in that the transmission line comprises a glass fibre of a suitably chosen length, which comprises a U-shaped loop having an outward part and a return part, which parts cross each other at suitably chosen spacings and, at the point of the crossings, are caused to be coupled to one another by means of fused couplers having suitably chosen coupling factors.

17. The optical circuit according to claim 2, characterized in that the signal-manipulating means comprises control means for controlling the signal intensity.

18. The optical circuit according to claim 2, characterized in that the signal-manipulating means comprises polarization-affecting means.

19. The optical circuit according to claim 8, characterized in that the transmission line comprises a number of concatenated pieces of glass fibre of suitable length, alternately having different refractive indices, coupled together by means of fusion welding.

20. The optical circuit according to claim 8, characterized in that the transmission line comprises a number of concatenated pieces of glass fibre of suitable length, having identical refractive indices, coupled together by means of fusion welding, there being incorporated in each fusion weld a reflection coating.

21. The optical circuit according to claim 8, characterized in that the transmission line comprises a glass fibre wherein, at suitably chosen spacings, loops are formed, each loop being closed by means of a fused coupler of the glass fibre with itself, using a suitably chosen coupling factor.

22. The optical circuit according to claim 8, characterized in that the transmission line comprises a glass fibre of a suitably chosen length, which comprises a U-shaped loop having an outward part and a return part, which parts cross each other at suitably chosen spacings and, at the point of the crossings, are caused to be coupled to one another by means of fused couplers having suitably chosen coupling factors.

23. System for measuring the reflection sensitivity of an optical transmission network, comprising an optical circuit, a first optical signal source connected to a first connection point of the optical circuit, a second optical signal source connected to a second connection point of the optical circuit, optical reflection means, optical receiving means connected to a third connection point of the optical circuit, the optical receiving means including detecting means for detecting a received reflected optical signal, the optical circuit including coupling means for coupling, via bidirectional optical connection lines, the first connection point for the first signal source to the third connection point for the receiving means, and the reflection means to the second connection point for the second signal source and the third connection point for the receiving means, which coupling means include a first waveguide junction via which the second connection point for the second signal source is coupled in the forward signal direction to the reflection means, characterized that the coupling means further includes a second waveguide junction via which the first connection point for the first signal source is coupled in the forward signal direction to the third connection point for the receiving means, which second junction is coupled to the first junction for the purpose of coupling the reflection means is in the forward signal direction to the third connection point for the receiving means via the first and second junction.

24. The system according to claim 23, characterized in that there are incorporated, in the coupling between the first and second junction, signal-manipulating means.

* * * * *

UNITED STATES PATENT AND TRADEMARK OFFICE
CERTIFICATE OF CORRECTION

PATENT NO. : 5,455,671
DATED : October 3, 1995
INVENTOR(S) : van Deventer

It is certified that error appears in the above-indentified patent and that said Letters Patent is hereby corrected as shown below:

```
Column 3, lines 43-44, "mortifying" should be --modifying--;
          line 58, "(N>I)" should be --(N≥1)--.

Column 7, line 62 (claim 8), "(N>I)" should be --(N≥1)--;
          line 67 (claim 9), "(N>I)" should be --(N≥1)--;

Column 8, line 5, (claim 10), "(N>I)" should be --(N≥1)--;
          line 11, (claim 11), "(N>I)" should be --(N≥1)--.

Column 10, line 8 (claim 23), after "characterized" insert
          --in--.
```

Signed and Sealed this

Sixteenth Day of September, 1997

Attest:

BRUCE LEHMAN

*Attesting Officer*  *Commissioner of Patents and Trademarks*